(12) United States Patent
Florendo et al.

(10) Patent No.: US 9,977,802 B2
(45) Date of Patent: May 22, 2018

(54) LARGE STRING ACCESS AND STORAGE

(71) Applicants: Colin Florendo, Marlborough, MA (US); Ivan Schreter, Malsch (DE); Mihnea Andrei, Issy les Moulineaux (FR)

(72) Inventors: Colin Florendo, Marlborough, MA (US); Ivan Schreter, Malsch (DE); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 695 days.

(21) Appl. No.: 14/524,998

(22) Filed: Oct. 27, 2014

(65) Prior Publication Data

US 2015/0142819 A1 May 21, 2015

Related U.S. Application Data

(63) Continuation-in-part of application No. 14/333,224, filed on Jul. 16, 2014.

(60) Provisional application No. 61/907,296, filed on Nov. 21, 2013.

(51) Int. Cl.
*G06F 17/30* (2006.01)
(52) U.S. Cl.
CPC .............................. *G06F 17/30312* (2013.01)
(58) Field of Classification Search
CPC ........... G06F 17/30985; G06F 17/2735; G06F 17/30321; G06F 17/30584; G06F 17/30312
USPC ....................................................... 707/741
See application file for complete search history.

(56) References Cited

U.S. PATENT DOCUMENTS

| 4,864,497 A | 9/1989 | Lowry et al. |
| 5,253,325 A * | 10/1993 | Clark .................. H03M 7/3084 704/200 |
| 5,577,249 A * | 11/1996 | Califano ........... G06F 17/30985 382/209 |
| 5,870,036 A | 2/1999 | Franaszek |
| 6,597,812 B1 * | 7/2003 | Fallon ................. H03M 7/3088 341/51 |
| 8,688,718 B1 | 4/2014 | Dubey et al. |
| 2008/0294863 A1 | 11/2008 | Faerber et al. |
| 2009/0063465 A1 * | 3/2009 | Ferragina .......... G06F 17/30619 |
| 2010/0030796 A1 | 2/2010 | Netz |

(Continued)

OTHER PUBLICATIONS

Abadi et al., "Column-Stores vs. Row-Stores: How Different are They Really?" *Proc. of the 2008 ACM SIGMOD Int'l Conf. on Management of Data*, 14 pp. (Jun. 2008).

(Continued)

*Primary Examiner* — Evan Aspinwall
(74) *Attorney, Agent, or Firm* — Klarquist Sparkman, LLP

(57) ABSTRACT

Techniques for handling large string values in a string dictionary within an in-memory database system are presented. The string dictionary can be a paged-column main dictionary. For example, a value block of a dictionary may be loaded into memory, where the dictionary stores values for dictionary compression. The value block may include a first portion of a large string value and one or more logical pointers to one or more large string pages containing a remainder of the large string value. The large string value may be materialized into a contiguous location in memory, and a pointer to the materialized large string value may be created.

20 Claims, 10 Drawing Sheets

(56) References Cited

U.S. PATENT DOCUMENTS

| | | | |
|---|---|---|---|
| 2010/0223237 | A1 | 9/2010 | Mishra et al. |
| 2010/0328115 | A1* | 12/2010 | Binnig .............. G06F 17/30454 341/51 |
| 2011/0078153 | A1* | 3/2011 | Motoki ............. G06F 17/30985 707/747 |
| 2011/0173164 | A1 | 7/2011 | Bendel et al. |
| 2011/0219020 | A1 | 9/2011 | Oks et al. |
| 2012/0221528 | A1 | 8/2012 | Renkes et al. |
| 2013/0060780 | A1 | 3/2013 | Lahiri et al. |
| 2013/0198152 | A1 | 8/2013 | McGhee et al. |
| 2013/0262486 | A1 | 10/2013 | O'Dell et al. |
| 2013/0325874 | A1 | 12/2013 | Weyerhaeuser et al. |
| 2014/0070966 | A1* | 3/2014 | Fablet ................. H03M 7/3086 341/55 |
| 2014/0214779 | A1* | 7/2014 | Francis ............. G06F 17/30153 707/693 |
| 2014/0304275 | A1 | 10/2014 | Baskett et al. |
| 2015/0106382 | A1 | 4/2015 | Liu et al. |

OTHER PUBLICATIONS

Abadi et al., "Integrating Compression and Execution in Column-oriented Database Systems," *SIGMOD*, pp. 671-682 (Jun. 2006).

Adb-El-Malek et al., "Early Experiences on the Journey Towards Self-Storage," *IEEE Data Eng. Bull*, vol. 29, No. 3, pp. 55-62 (2006).

Agrawal et al., "Automated Selection of Materialized Views and Indexes in SQL Databases," *Proc. of the 26th Int'l Conf. on VLDB*, pp. 496-505 (2000).

Arz et al., "LZ-Compressed String Dictionaries," *Data Compression Conf.*, pp. 322-331 (Mar. 2014).

Bhattacharjee et al., Efficient Index Compression in DB2 LUW, *Proc. of the VLDB Endowment*, vol. 2, Issue 2, pp. 1462-1473 (Aug. 2009).

Binnig et al., "Dictionary-based Order-preserving String Compression for Main Memory col. Stores," *SIGMOD*, pp. 283-295 (Jun. 2009).

Boncz et al., "Mil Primitives for Querying a Fragmented World," *The International Journal on Very Large Data Bases*, vol. 8, No. 2, pp. 101-119 (Oct. 1999).

Boncz et al., "MonetDB/X100: Hyper-pipelining Query Execution," *CIDR*, pp. 225-237 (2005).

Brisaboa et al., "Compressed String Dictionaries," *Proc. of the 10th Int'l Conf. on Experimental Algorithms*, vol. 6630, pp. 136-147 (May 2011).

Bruno et al., "An Online Approach to Physical Design Tuning," *Proceedings of the International Conference on Data Engineering*, pp. 826-835 (2007).

Chaudhuri et al., "An Efficient Cost-Driven Index Selection Tool for Microsoft SQL Server," *Proc. of the 23rd VLDB Conf.*, pp. 146-155 (1997).

Chaudhuri et al., "An Overview of Data Warehousing and OLAP Technology," *ACM SIGMOD Record*, vol. 26, No. 1, pp. 65-74 (Mar. 1997).

Chaudhuri et al., "Self-tuning Database Systems: a Decade of Progress," *Proc. of the 33rd Int'l Conf. on VLDB*, pp. 3-14 (Sep. 2007).

Cormack, "Data Compression on a Database System," *Communications of the ACM*, vol. 28, No. 12, pp. 1336-1342 (Dec. 1985).

Dageville et al., "Oracle's Self-Tuning Architecture and Solutions," *IEEE Data Eng. Bull.*, vol. 29, No. 3, pp. 24-31 (2006).

Farber et al., "SAP HANA Database—Data Management for Modern Business Applications," *ACM SIGMOD Record*, vol. 40, No. 4, pp. 45-51 (Dec. 2011).

Farber et al., "The SAP HANA Database—an Architecture Overview," *IEEE Data Eng. Bull.*, vol. 35, No. 1, pp. 28-33 (2012).

Garcia-Molina et al., "Main Memory Database Systems: an Overview," *IEEE Trans. on Knowledge and Data Engineering*, vol. 4, No. 6, pp. 509-516 (1992).

Goldstein et al., "Compressing Relations and Indexes," *Proc. Int'l Conf. on Data Engineering*, pp. 370-379 (Feb. 1998).

Gonzalez et al., "Compressed Text Indexes with Fast Locate," *Proc. 18th annual symposium on Combinatorial Pattern Matching*, pp. 216-227 (2007).

Idreos et al., "Estimating the Compression Fraction of an Index Using Sampling," *IEEE 26th Int'l Conf on Data Engineering*, pp. 441-444 (Mar. 2010).

Khoshafian et al., "A Query Processing Strategy for the Decomposed Storage Model," *IEEE Proc. of the Third Int'l Conf. on Data Engineering*, pp. 636-643 (Feb. 1987).

Kimura et al., "Compression Aware Physical Database Design," *Proc. Int'l Conf. on Very Large Data Bases*, vol. 4, No. 10, pp. 657-668 (Jul. 2011).

Knuth, *The Art of Computer Programming*, Volume 3: *Sorting and Searching*, Addison Wesley, 140 pp. (2007).

Krüger et al., "Optimizing Write Performance for Read Optimized Databases," *Proc. of the 15th Int'l Conf. on Database Systems for Advanced Applications*, 15 pp. (Apr. 2010).

Larsson et al., "Offline Dictionary-based Compression," *Proc. Data Compression Conf.*, pp. 296-305 (Mar. 1999).

Lemke, Physische Datenbankoptimierung in hauptspeicherbasierten Column-Store-Systemen, PhD thesis, Technische Universatät Ilmenau, 142 pp. (Mar. 2012).

Lemke et al., "Speeding Up Queries in Column Stores—a Case for Compression," *12th Int'l Conf. on Data Warehousing and Knowledge Discovery*, pp. 117-129 (Aug. 2010).

Mueller et al., "Adaptive String Dictionary Compression in In-Memory Column-Store Database Systems," *Proc. 17th Int'l Conf. on Extending Database Technology*, 12 pp. (Mar. 2014).

Navarro et al., "Compressed Full-text Indexes," *ACM Computing Surveys*, vol. 39, Issue. 1, No. 2, 79 pp. (Apr. 2007).

Paradies et al., "How to Juggle Columns: An Entropy-Based Approach for Table Compression," *Proc. of the 14th Int'l Database Engineering & Applications Symp.*, pp. 205-215 (Aug. 2010).

Plattner, "A Common Database Approach for OLTP and OLAP Using an In-memory Column Database," *Proc. of the 35th SIGMOD Int'l Conf. on Management of Data*, 7 pp. (Jun. 2009).

Plattner, "Compression," Hasso Plattner Institute, slideshow, 5 pp. (document not dated).

Rauhe, "HANA In-Memory Computing Engine—Concepts and Architecture Overview," 40 pp. (Oct. 2011).

Ray et al., "Database Compression: A Performance Enhancement Tool," *Proc. of 7th Int'l Conf. on Management of Data*, 20 pp. (1995).

Salomon, *Data Compression: The Complete Reference*, Chapter 3, "Dictionary Methods," pp. 171-261 (Dec. 2006).

Sap, "SAP HANA Modeling Guide," SAP HANA Platform SPS 08, Document Version: 1.1, 170 pp. (Aug. 2014).

Sattler et al., "QUIET: Continuous Query-driven Index Tuning," *Proc. of the 29th Int'l Conf. on VLDB*, vol. 29, pp. 1129-1132 (Sep. 2003).

Schnaitter et al., "COLT: Continuous On-line Database Tuning," *Proc. of the ACM SIGMOD Int'l Conf. on Management of Data*, pp. 793-795 (Jun. 2006).

Stonebraker et al., "C-store: A Column-Oriented DBMS," *VLDB*, pp. 553-564 (2005).

Tallman, "ASE 16: Data & Index Compression," SAP Community Network, 4 pp. (Aug. 2014).

Transaction Processing Performance Council, TPC-C Benchmark, http://www.tpc.org/tpcc/default.asp, Apr. 2013. 2 pages.

Transaction Processing Performance Council, TPC-H Benchmark, http://www.tpc.org/tpch/default.asp, Apr. 2013. 2 pages.

Westmann et al., "The Implementation and Performance of Compressed Databases," *ACM SIGMOD Record*, vol. 29, Issue 3, pp. 55-67 (Sep. 2000).

Willhalm et al., "SIMD-Scan: Ultra Fast In-Memory Table Scan Using On-chip Vector Processing Units," *Proc. of the VLDB Endowment*, vol. 2, Issue 1, pp. 385-394 (Aug. 2009).

Willhalm et al., "Vectorizing Database Column Scans with Complex Predicates," *Fourth International Workshop on Accelerating Data Management Systems*, 12 pp. (Aug. 2013).

(56) References Cited

OTHER PUBLICATIONS

Williams et al., "Compressing Integers for Fast File Access," *Comput. J.*, vol. 42, No. 3, pp. 193-201 (1999).
Witten et al., *Managing Gigabytes: Compressing and Indexing Documents and Images*, Morgan Kaufmann, San Francisco, CA, 551 pp. (1999).
Zhang, "Best Practice: Using DB2 Compression Feature in SAP Environment," *SAP Community Network*, 37 pp. (Jul. 2010).
Zukowski et al., "Super-Scalar RAM-CPU Cache Compression," *IEEE Proc. of the 22nd Int'l Conf. on Data Engineering*, 12 pp. (Apr. 2006).
Abadi, "Query Execution in Column-Oriented Database Systems," Massachusetts Institute of Technology, Ph.D. Thesis, 148 pp. (Feb. 2008).

* cited by examiner

SOFTWARE 1080 IMPLEMENTING DESCRIBED TECHNOLOGIES

LARGE STRING ACCESS AND STORAGE

CROSS REFERENCE TO RELATED APPLICATION

This application is a continuation-in-part of U.S. patent application Ser. No. 14/333,224, filed Jul. 16, 2014, which claims the benefit of U.S. Provisional Application No. 61/907,296, filed Nov. 21, 2013, both of which are incorporated herein by reference.

BACKGROUND

A database is an organized collection of data. Conceptually, data in a database can be organized as one or more tables, where a table is a two-dimensional structure with data values organized in rows and columns A row of a table contains the data values for one record of the table. A column of the table contains the data values of one field of the table across multiple records (rows) of the table.

An in-memory database may be loaded in main memory instead of read from disk storage as for some database systems. In-memory databases have the advantage of being able to be read from and written to quickly since read and write speeds for main memory are almost always faster than for disk storage. However, as database systems get larger, it becomes increasingly difficult to store the database (or tables of the database) entirely in main memory.

Therefore, there exists ample opportunity for improvement in technologies related to managing in-memory database systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for handling large string values in a string dictionary within an in-memory database system. For example, the string dictionary can be a paged dictionary for which pages are loaded into memory on demand. In many scenarios, the memory footprint of tables with a large number of columns and/or large columns can be reduced by supporting paged columns such that dictionaries are paged using traditional buffer cache and paging technologies.

In some embodiments, a value block of a dictionary may be loaded into memory, where the dictionary stores string values for dictionary compression. The value block may include (a) a first portion of a large string value and (b) one or more logical pointers to one or more large string pages containing a remainder of the large string value. The large string value may be materialized into a contiguous memory location, and a pointer to the materialized large string value may be created. A large string map may be created, which stores one or more pairs of values, where a pair of values includes an index as well as the large string value or the pointer to the materialized large string value. The dictionary may be a paged dictionary with some portions in memory and some portions on disk.

The large string value in the value block can be represented using segments that include (a) a first segment specifying a prefix length of a common prefix between the large string value and its predecessor string value, (b) a second segment specifying a length of the first portion of the large string value in the value block (that is, the length of the third segment), (c) a third segment comprising the first portion of the large string value, (d) a fourth segment specifying one or more logical pointers to the large string pages containing the remainder of the large string value, (e) a fifth segment specifying number of the logical pointers in the fourth segment, and (f) a sixth segment specifying a total length of the large string value.

In some embodiments, a computer-readable storage medium may be provided to support handling of large string values for a dictionary in memory. The structured data may include multiple dictionary blocks for a dictionary adapted to store one or more large string values for dictionary compression, where at least one of the multiple dictionary blocks stores at least part of one of the large string value(s). The structured data may also include one or more directory separator blocks for a separator directory adapted to include separators for the multiple dictionary blocks, each of the one or more directory separator blocks storing at least some of the separators. In general, a separator is a unique string prefix that indexes a string (e.g., the last string) stored in a dictionary block. A separator can be a large string value or normal string value. The structured data may also include one or more large string blocks for the large string value(s).

In some embodiments, a request for an entry of a dictionary having multiple dictionary blocks may be received, where the dictionary stores string values that are associated with corresponding value identifiers (IDs) for purposes of dictionary compression. One or more of the dictionary blocks can be selectively loaded into memory, and the loaded dictionary block(s) can be searched for the requested entry.

In some embodiments, a computer-readable storage medium may be provided to store structured data that can be used to load dictionary blocks for a dictionary into memory. The structured data may include multiple dictionary blocks for a dictionary that is adapted to store string values that are associated with corresponding value IDs for purposes of dictionary compression, where each of the dictionary blocks stores at least some of the string values. The structured data may also include one or more directory value ID blocks for a value ID directory that is adapted to include last value IDs for the dictionary blocks, where each of the directory value ID blocks stores at least some of the last value IDs. The structured data may also include one or more directory separator blocks for a separator directory that is adapted to include separators for the dictionary blocks, where each of the directory separator blocks stores at least some of the separators.

In some embodiments, a database system including one or more processors and memory may be provided. The memory may store one or more components for managing an in-memory column store (hereinafter, referred to as an "attribute engine"), which are adapted to provide access to a string dictionary. The memory may also store one or more components and/or structures for an in-memory vector implementation (hereinafter, referred to as a "basis"), which are adapted to store value block vectors, each of the value block vectors storing pointers to one or more value blocks for dictionary blocks of the string dictionary. The memory may also store one or more components and/or structures for column store table persistence (hereinafter, referred to as a "unified table component"). The unified table component may include a dictionary storage component adapted to load one or more of the dictionary blocks using on-demand paging, where each of the dictionary blocks comprises one or more value blocks. The unified table component may also include a large string handler adapted to provide access to large string values.

As described herein, a variety of other features and advantages can be incorporated into the technologies as desired.

The foregoing and other objects, features and advantages of the invention will become more apparent from the following detailed description, which proceeds with reference to the accompanying figures.

DETAILED DESCRIPTION

Figure 1:
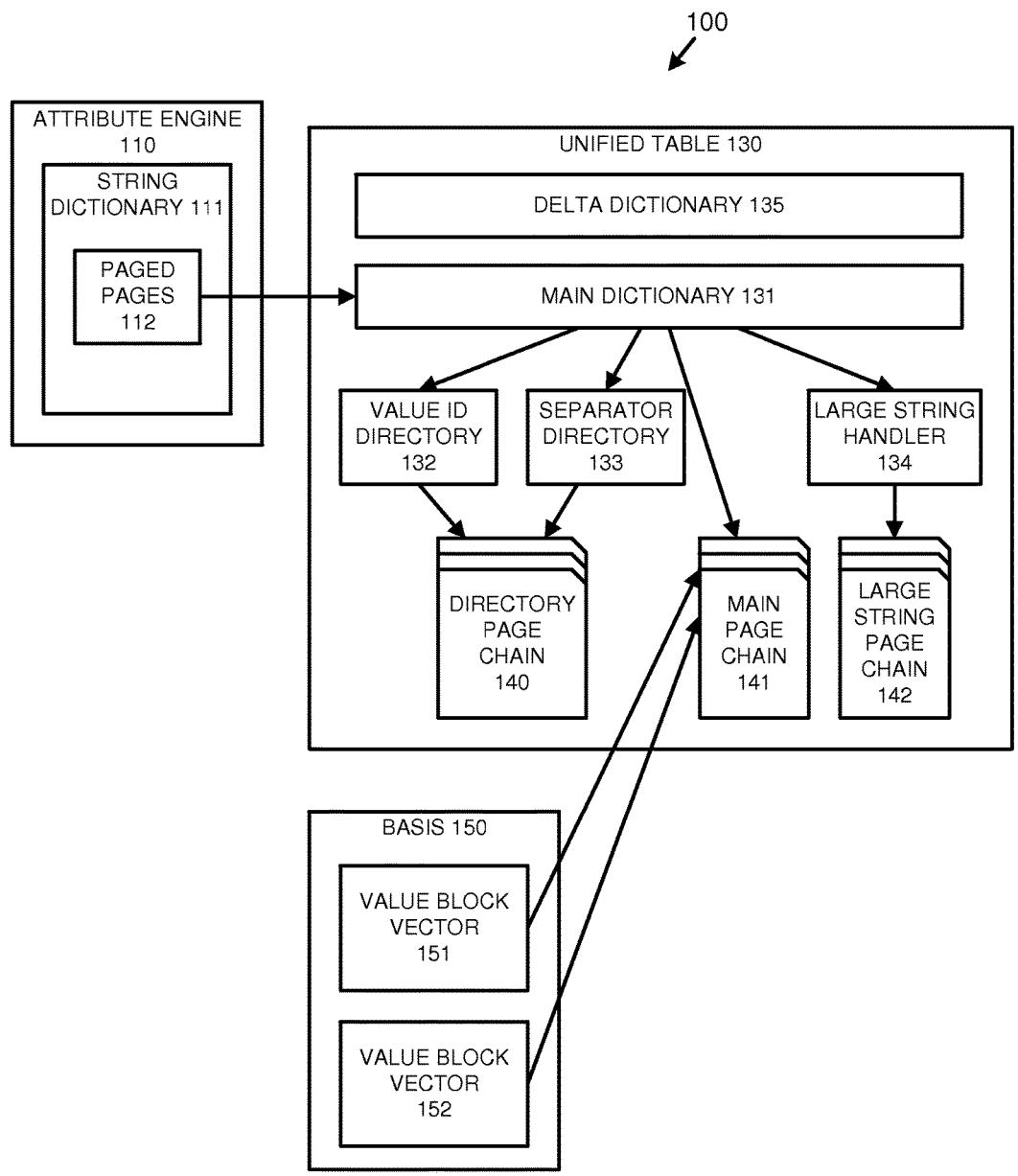
FIG. 1 is a diagram illustrating the architecture of an example in-memory database system that supports a paged-column main dictionary as well as a delta dictionary that is fully resident in memory.

The following description is directed to techniques and solutions for implementing large string handling in a paged column dictionary within an in-memory database system. For example, directories may be provided for a paged dictionary, where the directories are resident in memory and dictionary pages (i.e., value pages) are pageable.

A columnar table of an in-memory database system may include a delta part and a main part. The main part stores data for the table. The delta part receives changes to the table and stores these changes. A merge process may occasionally (e.g., periodically, or when the delta part reaches a certain size, etc.) update the main part with the delta part. For example, the merge process may copy a current main state of the main part and committed rows in the delta part into a new temporary state, sort the data for optimal compression, and overwrite the original main part. Committed rows may be removed from the delta part at the time of overwriting the original main part.

In some in-memory database systems, and, in particular, in some column-oriented database systems, dictionary compression may be used to reduce the in-memory and on-disk size of data. For example, for dictionary-compressed columns in a database, data and a dictionary associated with each column may be used to compress that column. When dictionary paging is not used, the data and dictionary are typically fully resident in memory. In contrast, when dictionary paging is used, pages of the dictionary are loaded into memory on demand when they are used. Either way, for a given column, each unique value may use a unique numeric value identifier (value ID), which may be associated with the unique value in the dictionary for the given column, so that the column data only stores the value IDs. Also, the corresponding unique values stored by the dictionary can be compressed using string prefix encoding or another form of encoding.

To access any data in a column store, when dictionary paging is not used, the entire contents of the dictionary and data for the column may be read into memory from disk as continuous vectors. However, the memory footprint of tables with a large number of columns and/or large columns can become fairly significant. In some cases, this memory footprint can be reduced at the cost of column data read performance, by defining specific columns to be represented both in-memory and on-disk as a collection of pages, rather than continuous vectors. The memory footprint of a paged column is reduced by requiring only an active subset of the column's data and dictionary pages in memory, which can be retrieved on demand from a persistent disk file. Furthermore, in order to reduce the memory footprint without affecting write performance, the main part of the column store may use a paged representation while the delta part does not use a paged representation.

In some example implementations, for a paged dictionary, an in-memory data storage platform separates dictionary directory structures (constructed from directory pages) from dictionary data pages, such that the directory structures are resident in memory, but the dictionary data pages are pageable (and loaded into memory on demand). Thus, for a page-loadable column, the entire data for the column does not have to be loaded into memory to access a single value. Instead, only a small set of data is loaded into memory, including the dictionary value page that contains the single value (among other values, typically) as well as mapping information (in directory structures) used to retrieve the single value. The platform unifies handling of paged column dictionaries and regular (non-paged column) dictionaries, so that either or both types of dictionary can be used. Also, the platform unifies handling of large string values and other (non-large) string values. Large string values can be stored on their own pages and have logical pointers encoded into normal string values in a directory structure and dictionary data pages.

Example 1—In-Memory Database System

FIG. 1 is a diagram illustrating the architecture of an example in-memory database system 100 that supports a paged-column main dictionary as well as a delta dictionary that is fully in memory. The in-memory database system 100 may be implemented by various types of computing devices, such as computer servers, data storage systems, cloud computing resources, networking resources, etc. The in-memory database system 100 in FIG. 1 comprises an attribute engine 110, a unified table 130, and a basis 150, which can be organized as different component layers.

In general, the attribute engine 110 processes low-level database queries and provides mechanisms to query data from a table. For a column (attribute) of the table, the attribute engine 110 manages access to an index vector or other data representing values for the column, as well as access to a dictionary. The dictionary can be a paged dictionary, or the dictionary can be a non-paged dictionary, depending on the class of the attribute. A paged attribute is a class that facilitates access to data values and storage of data values in a paged column dictionary.

The attribute engine 110 may, e.g., form part of an in-memory column store such as the in-memory column store of the HANA platform (HANA is a database platform provided by SAP®) or another platform, so as to provide in-memory access to dictionary compressed column data. In FIG. 1, the attribute engine 110 includes one or more components for a string dictionary 111. One or more components for the string dictionary 111 or other components of the attribute engine 110 may expose application programming interfaces (APIs) for, e.g., queries, such that data access via the attribute engine 110 is passed through the string dictionary 111. Alternatively, access to the string dictionary 111 can be exposed in some other way.

The component(s) for the string dictionary 111 represent a dictionary for variable-sized data, providing access and search functionality. The component(s) for the string dictionary 111 interact with components of the unified table 130. For this purpose, a component for the string dictionary 111 includes a handle to the main dictionary 131, which is a storage object of the unified table 130. For a non-paged, in-memory dictionary, this handle may be null, but the handle may have a valid, non-null value for a paged column dictionary. (For a non-paged, in-memory delta dictionary 135, the component for the string dictionary 111 can include a different handle (not shown in FIG. 1) to the non-paged, in-memory delta dictionary 135.)

As shown in FIG. 1, the handle to the main dictionary 131 can be contained in a component for paged pages 112 (e.g., a component implementing an encoded string storage API) in the string dictionary 111. The component for paged pages 112 manages a container storing "physical pages" of a paged variable-sized attribute dictionary, and provides access to the strings encoded therein. For example, a physical page may contain one or more value blocks, where each value block consists of up to 16 prefix-encoded strings. (In general, a value block contains 16 prefix-encoded strings, but may contain fewer prefix-encoded strings if one of the strings has a large string value. In this case, the value block ends with the large string value, and the value block including the large string value is the last value block of a dictionary block, such that the large string value is the last string value in the dictionary block.) With the handle, the component for paged pages 112 facilitates paged persistence through access to the storage object for the main dictionary 131.

The attribute engine 110 may also contain a handle (not shown in FIG. 1) to in-memory transient vector(s), such as value block vectors, storing pointers to value blocks in dictionary blocks, which are part of the basis 150.

The unified table 130 includes components that represent parts of a table. The unified table 130 may include a main dictionary 131 that stores variable length data (e.g., strings, fixed length strings, raw data, etc.). The main dictionary 131 is a storage component that serves as a point of interface between the attribute engine 110 and the unified table 130. The main dictionary 131 can contain a handle (not shown in FIG. 1) to the in-memory transient vector(s) (such as value block vectors) storing pointers to value blocks in dictionary blocks, which are part of the basis 150. The main dictionary 131 can also contain a handle to a dictionary block handler (DBH), or multiple handles to DBHs, as described in the next paragraphs.

For example, one DBH is a component that provides functionality to read from/write to a dictionary page, which includes value blocks. To provide this functionality, this DBH communicates with a component for the main page chain 141, which contains a chain of dictionary pages. A dictionary page represents a page of dictionary values, organized as value blocks. The component for the main page chain 141 can also provide functionality to manage dictionary pages, e.g., to load and pin a page, to allocate a new page, etc. Thus, main dictionary pages may be selectively loaded into memory as part of the main page chain 141.

As another example, another DBH is a component that manages in-memory transient structures used to access pages of a paged dictionary. One such DBH can manage construction of a value ID directory 132 and persistence of data for the value ID directory 132. Another such DBH can manage construction of a separator directory 133 and persistence of data for the separator directory 133.

The unified table 130 may also include a delta dictionary 135. The delta dictionary 135 acts as a temporary data repository where changes made to the unified table 130 or new entries are stored. Upon a delta merge, the entries in the delta dictionary 135 are added to the main dictionary 131. The delta dictionary 135 is fully loaded in memory and can contain large string values. The delta dictionary 135 can have its own DBH, page chain and dictionary pages for dictionary blocks with values in the delta dictionary 135. The delta dictionary 135 does not, however, have directories such as a value ID director and separator directory, since the delta dictionary 135 is not paged into memory. The delta dictionary 135 can have its own large string handler. The block format for strings in the delta dictionary 135 can be the same as the block format for strings in the main dictionary 131 (see below) or it can be a different format.

The value ID directory 132 and separator directory 133 provide access to dictionary value block pages, given a value ID or search string, respectively. For example, the value ID directory 132 and separator directory 133 may be constructed from one or more directory page chains 140, each directory page containing value IDs or pointers to search strings. Details of the directory paging and construction of the value ID directory 132 and separator directory 133 will be explained below.

In some embodiments, the value ID directory 132 and separator directory 133 are loaded directly into memory. The separator directory 133 can include logical pointers, which are loaded into memory, to separator values represented on one or more other pages in a separator page chain (not shown in FIG. 1, but explained below). In general, a separator is a unique string prefix that indexes a string (e.g., the last string) stored in a dictionary block. A separator can be a large string value or normal string value. In other embodiments, the unified table may include only one of the value ID directory 132 and separator directory 133. In still other embodiments, the paged dictionary values need not be accessed by a value ID or search string, and may be accessed by other means, e.g., an index value.

In the case of large strings (e.g., strings longer than a threshold size of 32K, or some other threshold size), such strings may be fragmented across multiple pages. The unified table 130 may include a large string handler 134 that provides, e.g., for construction of a large string map, pointers to pages forming a large string page chain 142. For example, the large string handler 134 constructs a large string map, which is a transient object containing information about reconstructed large string values and their indices. Details of the large string handling are further explained below.

Alternatively, the unified table 130 may include one or more additional components or layers of components. For example, an intermediate component can include a handle to the main dictionary 131 and a handle to the main page chain 141.

The basis 150 provides generic structures such as value block vectors 151, 152, which include pointers to sorted dictionary values in value blocks of a dictionary page. For example, a value block vector 151, 152 stores pointers to (memory addresses of) the starts of the respective value blocks in a dictionary page. Thus, the basis 150 may provide value block vectors 151, 152 to search loaded pages from the main page chain 141 (i.e., the dictionary blocks of the main dictionary) for paged dictionary values. The process for searching paged dictionary values will be explained in further detail below.

During bootstrapping operations for a paged dictionary, directory pages are loaded into memory. The main dictionary 131 (dictionary storage object) may access the dictionary pages and populate the transient in-memory vectors to contain dictionary values or pointers to dictionary values (or, more specifically, pointers to value blocks containing the dictionary values) on demand as dictionary pages are loaded.

During merge operations for a paged dictionary, main dictionary 131 (dictionary storage object) allocates new dictionary pages (via a DBH and the main page chain 141) and writes sorted and prefix-encoded dictionary values from the main dictionary 131 and delta dictionary 135 on pages in units of blocks.

In general, as used herein, the term "block" refers to a data structure in memory or persistent storage, and the term "page" refers to the data being loaded into memory. In some examples (e.g., for dictionary pages), a single block may be contained in a page, but there need not be a one-to-one relationship between blocks and pages. For example, multiple blocks may exist on one page (e.g., a page can include multiple value ID directory blocks and/or multiple blocks of logical pointers for separators, or a dictionary page can include multiple dictionary blocks). It should be apparent from the descriptions when a page contains a single block or multiple blocks.

The in-memory data system 100 can also include a regular (non-paged) dictionary that stores variable length data (e.g., strings, fixed length strings, raw data, etc.). The regular dictionary can contain a handle to a DBH, or multiple handles to DBHs. For example, one DBH may be a component that provides functionality to read from/write to a dictionary, which contains value blocks.

Example 2—Data Layouts for a Value Block

With a dictionary for a column of variable-sized values, the data for the dictionary can be organized (both in memory and on disk) as a series of value blocks. A dictionary block contains one or more value blocks.

Figure 2A:
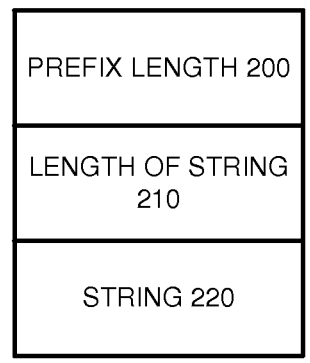
FIG. 2a is a diagram illustrating data layout for the segments of a first example structure for storing a string value in a value block.

FIG. 2a is a diagram illustrating the data layout for segments of an example structure for storing a string value in a value block. A value block may contain a fixed number of prefix-encoded string values having the data layout shown in FIG. 2a, e.g., 16 prefix-encoded string values. As an illustrative example, a value block may begin with the sequence "4 J o h n 4 3 son 2 3 n e s 0 6 Miller . . . " to represent the sorted string values John, Johnson, Jones, Miller, . . . .

A first segment of the string value may specify a prefix length 200. The prefix length specifies the number of characters that the string of the string value has in common with its predecessor string in the same value block. The first string value of a value block (i.e., the start of the value block) does not have a predecessor string, so its prefix length can be omitted. Alternatively, the first string value in a value block may include a first segment using, e.g., 0 or some other value indicating a first string value. Using the above illustrative example, for the second string value "Johnson," '4' indicates the number of characters in common with its predecessor string, i.e., "J o h n." The segment for prefix length 200 can have a fixed length, e.g., one byte. For the first string value in a value block, the prefix length 200 can be omitted, or it can be included so that formatting is consistent.

A second segment of the string value may specify a length of the remaining characters of the string 210, after the shared prefix. For example, in the illustrative example above, the first string value "John" contains the sequence "4 John" in the second and third segments. The '4' specifies the length of the string "John." For the second string value "Johnson," the '3' specifies the length of the remaining characters "s o n." Combined with the characters in common with its predecessor string value, "J o h n," the resulting string is "Johnson." The segment for remainder length 210 can have a variable length, e.g., one to six bytes using UTF-8 encoding.

A third segment can comprise the non-shared, remainder characters of the string 220. For the first string value in the above example, the characters "J o h n" result in the string "John." For the second string value in the above example, the characters "s o n" result in the string "Johnson." The segment with remainder characters of the string 220 has a length indicated by the second segment 210.

By using the above compression scheme, storage is reduced for the strings, providing savings in storage space.

Figure 2B:
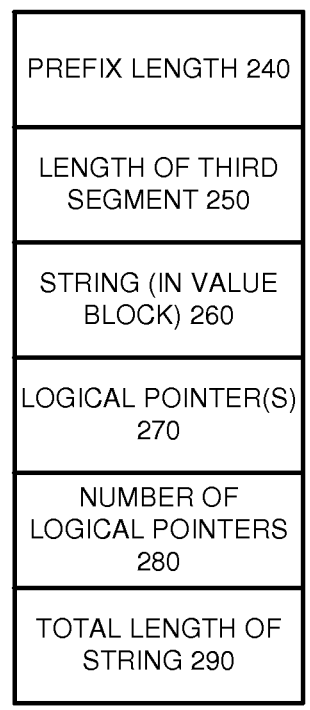
FIG. 2b is a diagram illustrating data layout for the segments of a second example structure for storing a string value in a value block, which may be used for a large string value.

FIG. 2b is a diagram illustrating the data layout for segments of another example structure for a string value in a value block, which can be used for a large string. A value block may contain a variable number of prefix-encoded string values having the data layout shown in FIG. 2b, e.g., up to 16 prefix-encoded string values. One or more of the prefix-encoded strings of a value block may be a large string. Although a value block by default contains 16 prefix-encoded strings, the value block may contain fewer prefix-encoded strings if one of the strings has a large string value. In this case, the value block ends with the large string value, and the value block including the large string value is the final value block of a dictionary block, such that the last string value of the dictionary block is the large string value. (As noted, a dictionary block includes one or more value blocks. The number of value blocks in a dictionary block can vary depending on the sizes of strings in the value block(s). For a value block that contains a large string value, a portion of the large string value is stored "on page" in the value block and consumes remaining space in the dictionary block.)

For a string value, a first segment may specify a prefix length 240 of a common prefix between the string value and its predecessor string value, similar to the prefix length 200 described above. The segment for prefix length 240 can have a fixed length, e.g., one byte. For the first string value in a value block, the prefix length 240 can be omitted (with its value inferred to be zero), or it can be included so that formatting is consistent.

A second segment may specify a length of the characters of the current string value 250 in the value block. That is, the second segment may specify the length of the portion of the current string value that is in the value block. The segment 250 (indicating the length of the characters of the current string value that are in the value block) can have a variable length of bytes encoded using UTF-8 encoding.

A third segment may include characters of the current string value 260 that are stored in the value block itself (i.e., a portion of the string after any prefix portion shared with the predecessor string). If a string is smaller than a threshold size, e.g., 32K or some other size (such as the remaining space in a dictionary block), these remaining characters of the string can be stored "on page" (entirely in the value block). For a string larger than the threshold size, the string may be treated as a large string, which is fragmented between the third segment of the value block and one or more large string pages. In this case, a portion (of the remaining characters) of the large string is stored in the third segment. The remainder of the large string (after the shared prefix and the characters stored in the third segment) may be stored as one or more large string blocks (at one or more large string pages). When determining how many characters of the current string value will fit in the third segment, the block size (remaining space) in the value block (dictionary block), the total length of the string 290, and the number of logical pointer (LPs) 280 can be considered. For example, a limit on the length of the third segment (how many characters of the current string value can fit in the third segment) is determined by the maximum length of the value block (that is, the remaining space in the dictionary block)−n bytes−m bytes, where n accounts for the bytes in the prefix length 240, bytes in the length 250, bytes in the number of LPs 280, bytes in the total string length 290, and where m is the number of bytes used by previous strings, if any, in the value block. If the number of remaining characters of the current string value (total string length minus shared prefix length) is less than or equal to the limit, all of the remaining characters of the current string value can be stored "on page" in the third segment. Otherwise (number of remaining characters is greater than the limit), the count of characters of the current (large) string value that will fit in the third segment can be calculated from the limit, the total string length 290 and bytes from any LP(s) 270 that will be used for the large string value. (If the string has a non-zero prefix length, the total length can also account for the prefix length.)

A fourth segment may specify zero or more LPs 270 to large string pages storing overflow data for a large string. Each LP 270 may be, e.g., 8 bytes in length. When the fourth segment includes multiple LPs, the LPs can be ordered from the end of the fourth segment to the start of the fourth segment.

A fifth segment may identify the number of LPs in the fourth segment 280. The fifth segment can be a 2-byte value that contains the number of LPs 280. For example, if the remainder of a large string is contained in two large string blocks, the number of LPs 280 would be 2.

A last segment may specify a total length of the string 290. The last segment can be a 6-byte value that contains the total length of the string 290. Alternatively, the total length 290 can indicate the length of the remainder of a string after the prefix of the string.

For example, suppose the first segment is a one-byte field storing the value 0 (no prefix), the second segment is a one-byte field storing the value 90 (length of the one-byte characters for the string value stored "on page" in the value block), the third segment stores the 90 one-byte characters for the string, the fourth segment is omitted, the fifth segment is a two-byte field storing the value 0 (no LPs), and the sixth segment is a 6-byte field storing the value 90 (total length of the string). Or, as another example, suppose the first segment is a one-byte field storing the value 17 (prefix length of 17), the second segment is a one-byte field storing the value 13 (length of the one-byte characters for the string value stored "on page" in the value block), the third segment stores the 13 one-byte characters for the string, the fourth segment is omitted, the fifth segment is a two-byte field storing the value 0 (no LPs), and the sixth segment is a 6-byte field storing the value 30 (total length of the string). Or, as another example, this one involving a large string value, suppose the first segment is a one-byte field storing the value 97 (prefix length of 97), the second segment is a three-byte field storing the value 32787 (length of the one-byte characters for the string value stored "on page" in the value block), the third segment stores the 32787 one-byte characters for the "on page" portion of the string, the fourth segment is an 8-byte field storing a LP to a large string page, the fifth segment is a two-byte field storing the value 1 (one LP), and the sixth segment is a 6-byte field storing the value 53211 (total length of the string). The large string page stores the remaining 53211−32787−97=20327 characters of the string.

Alternatively, a value block can have a different data layout. For example, one or more string values in a value block can be compressed using some other type of string compression.

In some embodiments, a large string value may be stored at an entirely different location than in the value block. For example, the value block may contain a reference to the location of the large string value, but not include any portion of the large string value.

The layouts of value blocks shown in FIGS. 2a and 2b can be used for a paged dictionary (in a main dictionary block). A delta dictionary or non-paged dictionary can use the same layout or a different layout for value blocks.

Example 3—Data Layouts for a Large String Value

Figure 3A:
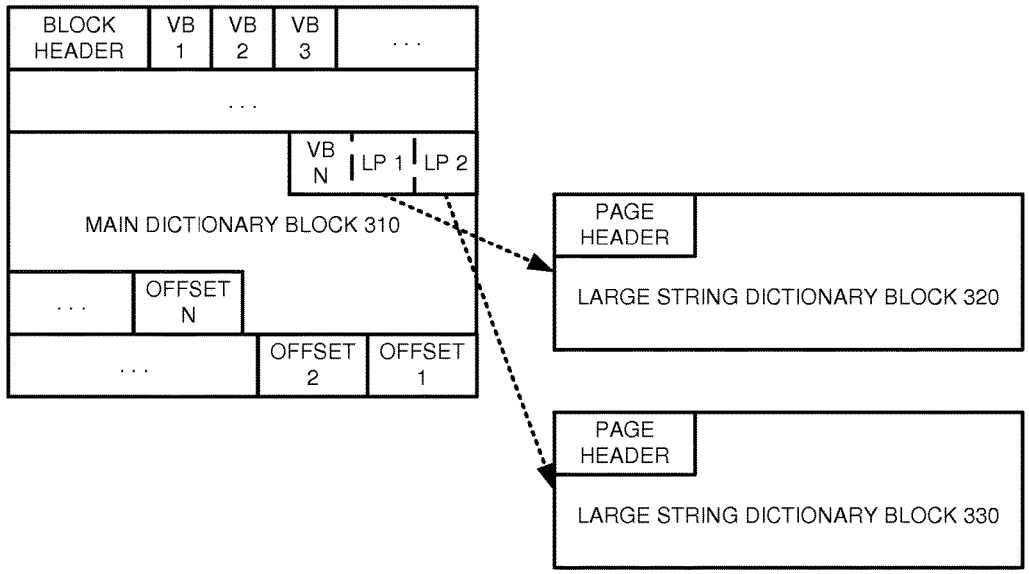
FIG. 3a is a diagram illustrating data layout where a large string value is stored partially in a value block and partially in large string dictionary blocks.
Figure 3B:
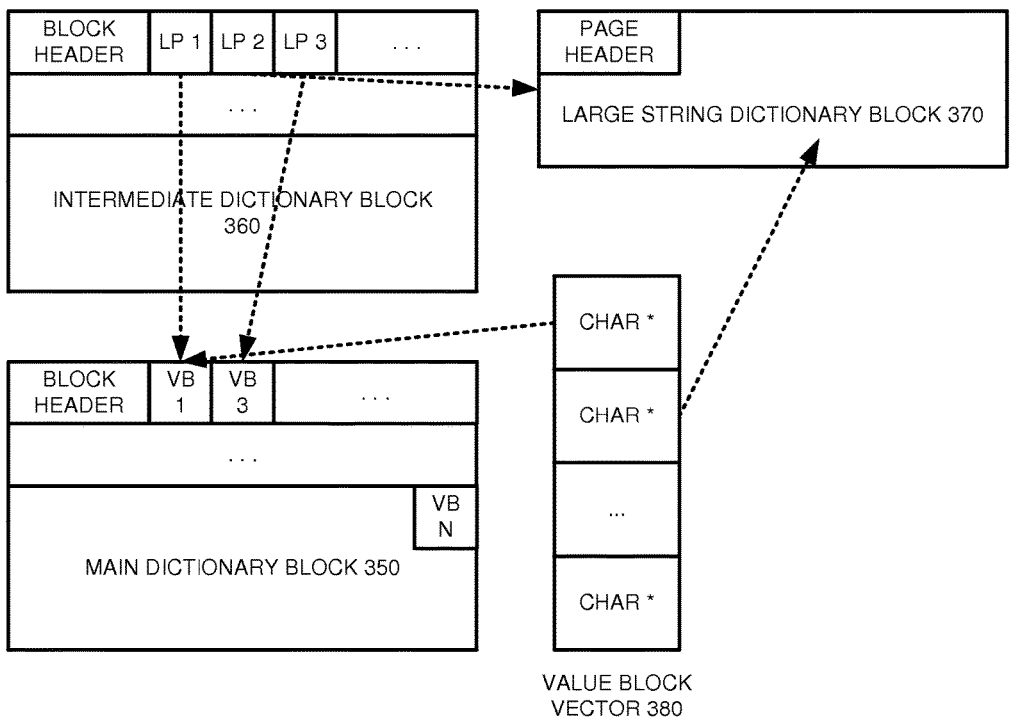
FIG. 3b is a diagram illustrating data layout where an intermediate block is used that stores pointers to large string values and value blocks.

FIGS. 3a and 3b are diagrams illustrating different data layouts for a large string value. FIG. 3a illustrates a scenario where the large string value is stored partially in a value block and partially in one or more large string dictionary blocks. As described in the previous section, a portion of a string can be stored in a value block of a main dictionary block 310. The remaining characters (not counting the prefix) may be stored in one or more large string dictionary blocks 320, 330. Each of the large string dictionary block 320, 330 may include a page header. One or more large string dictionary blocks 320, 330 may be stored on a large string dictionary page.

The large string value may be fully materialized upon access. For example, if a large string value is accessed, the large string value will be materialized and the large string value may be accessed using a pointer to the large string value. In some embodiments, a string value greater than 32K in length, or another size (e.g., a string value that does not fit within remaining space in a dictionary block), may be considered a large string value.

The main dictionary (paged column dictionary) may utilize main dictionary blocks 310 and large string dictionary blocks 320, 330 to support large string values. As will be described in further detail below, a main dictionary block 310 may contain one or more value blocks and 32-bit offsets to the value block(s). A portion of a large string value will reside in a value block of a main dictionary block 310, and the remainder of the large string value will reside in one or more large string dictionary blocks (such as the blocks 320, 330 in FIG. 3a). The logical pointers to the large string dictionary blocks 320, 330 may be stored in the value block. In this example, a main dictionary string block will span an entire dictionary page, i.e., a dictionary page will store a single main string dictionary block. FIG. 3a shows a large string value in a final value block (value block N) of the main dictionary block 310.

A large string dictionary block 320, 330 may store a portion of the large string value. The logical pointer to a large string dictionary block will be stored in a main dictionary block 310, e.g., in a segment for the large string value in a value block. Each table fragment may have a single page chain for large string dictionary blocks 320, 330. Since remainder portions of a large string value may be contained on more than one large string dictionary block, the logical pointers of the value block are used (i.e., the logical pointers are retrieved in order). The page header of the large string dictionary blocks 320, 330 may contain information on the next block (e.g., number of characters of the string until the start of the string in the next block).

A dictionary storage object may be associated with a value block vector (in a basis component) storing pointers to the start of each value block, respectively. In addition, the main dictionary may also contain a transient object containing information about materialized large string values and their indexes, i.e., large string map.

The value blocks and large string dictionary blocks 320, 330 may be used to build fully materialized large string values. The one or more large string dictionary blocks 320, 330 for a large string may be loaded in parallel. The large string map may store an index and large string value (or pointer to the large string value), as a pair of values. Thereafter, in order to retrieve a large string value, the large string map may be searched for the string (e.g., using an auxiliary data structure that associates value IDs with index values of the large string map).

For a delta dictionary (non-paged, fully resident in memory), a large string value can similarly be split between a value block and one or more large string dictionary blocks. In this case, however, the value block is loaded into memory as one of the value blocks for the delta dictionary, not as part of a main dictionary block.

FIG. 3b illustrates an alternative layout in which an intermediate block is used to access strings (which may have large string values or normal string values). The intermediate block stores one or more logical pointers, each of which may reference a value block or a large string dictionary block. Value blocks for normal strings may be placed in a main dictionary block 350. A large string value may be placed in a large string dictionary block 370. An intermediate dictionary block 360 may contain a logical pointer to a value block of the main dictionary block 350 or the large string dictionary block 370. In FIG. 3b, the intermediate dictionary block 360 stores a first logical pointer to a first value block in the main dictionary block 350, a second logical pointer to the large string dictionary block 370, and a third logical pointer to a second value block in the main dictionary block 350. In some embodiments, block offsets may be converted to logical pointers and stored in a separate dictionary block (i.e., intermediate dictionary block 360, from end to start). Although only a single large string dictionary block 370 is shown in FIG. 3b, it should be understood that multiple large string dictionary block may exist, where each large string value is stored in a different large string dictionary block.

The value block vector 380 of the main dictionary may maintain pointers (not shown) to the respective logical pointers in the intermediate dictionary block 370. In this case, string access may be performed through a pointer of the value block vector 380 and hence through the intermediate dictionary block 370. Alternatively, the value block vector 380 may maintain pointers to the start of each value block and/or large string dictionary block, as appropriate. The main dictionary may also contain an additional object containing information about the indexes of the large string dictionary block 370 (e.g., large string map). String access may be performed through the intermediate dictionary block 360 or through a pointer of the value block vector 380.

Example 4—Dictionary Block and Value Block Vector

Figure 4:
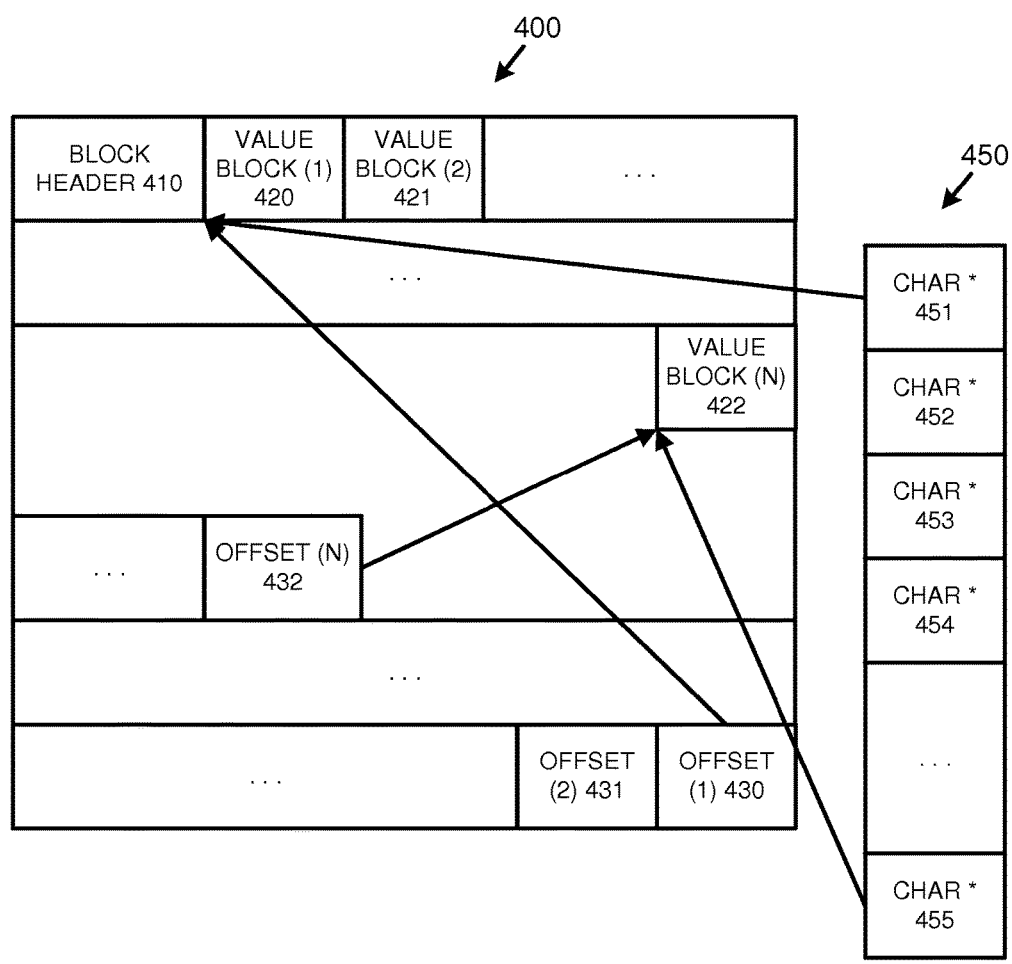
FIG. 4 is a diagram illustrating data layout for an example dictionary block and an example value block vector.

FIG. 4 is a diagram illustrating data layout for an example dictionary block 400 and value block vector 450 (also called a value block pointer vector). The dictionary block 400 may include a variable dictionary block header 410, one or more value blocks 420, 421, 422, and corresponding offset values 430, 431, 432.

The variable dictionary block header 410 specifies how many value blocks 420, 421, 422 are included in the particular dictionary block 400 (i.e., the number of value blocks in the dictionary block 400, which can be one or more). The variable dictionary block header 410 may include data comprising a last value ID for the value blocks in the dictionary block 400. The block header 410 may also include a first value ID for the value block(s) in the dictionary block 400, which can be used when accessing string values in the value block(s) in the dictionary block 400. The last value in the dictionary block 400 may be a large string value.

The dictionary block 400 then includes the one or more value blocks 420, 421, 422. The value blocks 420, 421, 422 can store prefix-encoded values. The data layout for the value blocks 420, 421, 422 can be the layout shown in FIG. 2a, the layout shown in FIG. 2b, or some other data layout.

Each value block 420, 421, 422 may be addressed by a corresponding offset value 430, 431, 432 for accessing the value block 420, 421, 422 in the dictionary block 400, where the offset value 430, 431, 432 specifies how many bytes from the beginning of the dictionary block 400 a particular value block 420, 421, 422 begins. The offset values 430, 431, 432 start from the end of the dictionary block 400. The offset values 430, 431, 432 can have a fixed length of, e.g., 4 bytes. For example, offset (1) 430 indicates the number of bytes from the beginning of the dictionary block 400 to the start of value block (1) 420, offset (2) 431 indicates the number of bytes from the beginning of the dictionary block 400 to the start of value block (2) 421, and so on. The dictionary block 400 is persistent (i.e., stored on fixed media/disk), but it can also be loaded into memory as a dictionary page.

In contrast, the value block vector 450 typically exists in memory only (making it transient). The value block vector 450 is an in-memory array that indexes the value blocks in the dictionary block 400. The value block vector 450 may include physical memory pointers (e.g., C++ character pointers) 451, 452, 453, 454, 455 to the starts for the value blocks, respectively. Each value block vector 450 may be associated with a dictionary block 400. When the value blocks and/or strings contained within the value blocks are loaded into memory, the offsets in the dictionary block 400 may be digested to determine the entries of the value block vector 450. Each entry in the value block vector 450 (i.e., char *) may reference the start of a particular value block in the dictionary block. For example, value block pointer 455 may point to the start of value block (N) 422. The dictionary block 400 may be searched using the value block vector 450.

The value block vector 450 (storing pointers to the start of each value block) and a large string map (storing or referencing large strings) may be associated on a per page basis with a corresponding dictionary block 400 in that page. These transient objects (value block vector 450 and large string map) may be created for every page that is loaded in memory. The large string map may store one or more pairs of values, each of the one or more pairs of values including an index and a large string value (or a pointer to a large string value).

A large string value may be materialized for one of the one or more pairs of values in the large string map. The materializing may include loading part of the large string value from a value block of the dictionary block (e.g., from a third segment of the data layout described with reference to FIG. 2b) and loading part of the large string value from one or more large string dictionary blocks (such as those referenced by LPs in the data layout described with reference to FIG. 2b). When a value block stores LPs to multiple large string dictionary blocks for a large string value, the large string pages for those large string blocks can be loaded into memory in parallel when materializing the large string value for the large string map, which can speed up the process of materializing the large string value. Typically, even though a large string value may be split into different large string dictionary blocks in physical storage, a materialized large string value is loaded into a single contiguous memory location.

In terms of data layout, a large string dictionary block may include a header (indicating, e.g., size of string in the large string dictionary block) and part of a large string value. Each large string dictionary page may contain a large string dictionary block.

The dictionary block 400, value block vector 450 and large string map can be used during load, access and merge operations. For example, for a load operation, a dictionary storage object (such as the main dictionary 131 described with reference to FIG. 1) pins a dictionary page containing the dictionary block 400 in memory. At this point, each entry of the value block vector 450 points to the start of a corresponding value block in the dictionary block 400. The dictionary storage object uses large string dictionary pages, if any, to materialize large string values, if any, for the large string map. For any large string value, the large string map stores a pair of an index value and large string value (or pointer to the large string value). The large string dictionary pages may be unpinned as large string values having remainder portions therein are materialized.

As another example, for an access (get) operation, the value block vector 450 is used to look up a dictionary value in the dictionary block 400 loaded into memory. In general, the value is looked up in the dictionary block 400 using the value block vector 450, decoded and returned (or, a pointer to the value block is returned). If the value is a large string value, a pointer to the large string value in a single contiguous memory location can be returned. (If the large string value has not been materialized or if a large string map is not used during the access operation, the large string value can be materialized dynamically for the access operation, and a pointer to the large string value in the single contiguous memory location can be returned.) Alternatively, for a large string value, the value can be looked up in a large string map (e.g., using an auxiliary data structure that maps value IDs to large string map index values), and a pointer to the large string value can be returned.

As another example, for a merge operation, data is written, one value block at a time, to an allocated page containing a dictionary block 400. As appropriate, overflow data is written to one or more large string dictionary blocks in large string dictionary pages. The value block vector 450 is updated accordingly. Allocated pages for main dictionary blocks may be pinned temporarily, when a string contained therein is being accessed, then unpinned afterwards so as to allow them to be paged to disk. Pages containing large string dictionary blocks will be unpinned when filled.

In some example implementations, a string dictionary can be a fully loaded (non-paged) dictionary or a paged dictionary. A paged dictionary includes multiple dictionary pages having dictionary blocks, such as the dictionary block 400. The paged dictionary can be arranged such that data is paged to and from disk on demand. Transient data structures (such as the value block vector 450 and a large string map) are associated with a dictionary page (and hence a dictionary block). Structures for page lookup operations (such as a value ID directory and separator directory, as described below) are associated with the entire paged dictionary. In contrast, for a fully loaded (non-paged) dictionary, data values (e.g., regular length string values) are fully resident in memory, and a transient data structure (value block vector) is associated with the entire dictionary. For the loaded dictionary, any large string value can be materialized on demand.

In some embodiments, one or more offset value may reference something other than a value block. For example, in a data layout in which a large string value is located entirely in a large string dictionary block (i.e., no portion of the large string value in a corresponding value block), the offset value may address the large string dictionary block.

Example 5—Directory and Dictionary Pages for Unified Table

Figure 5:
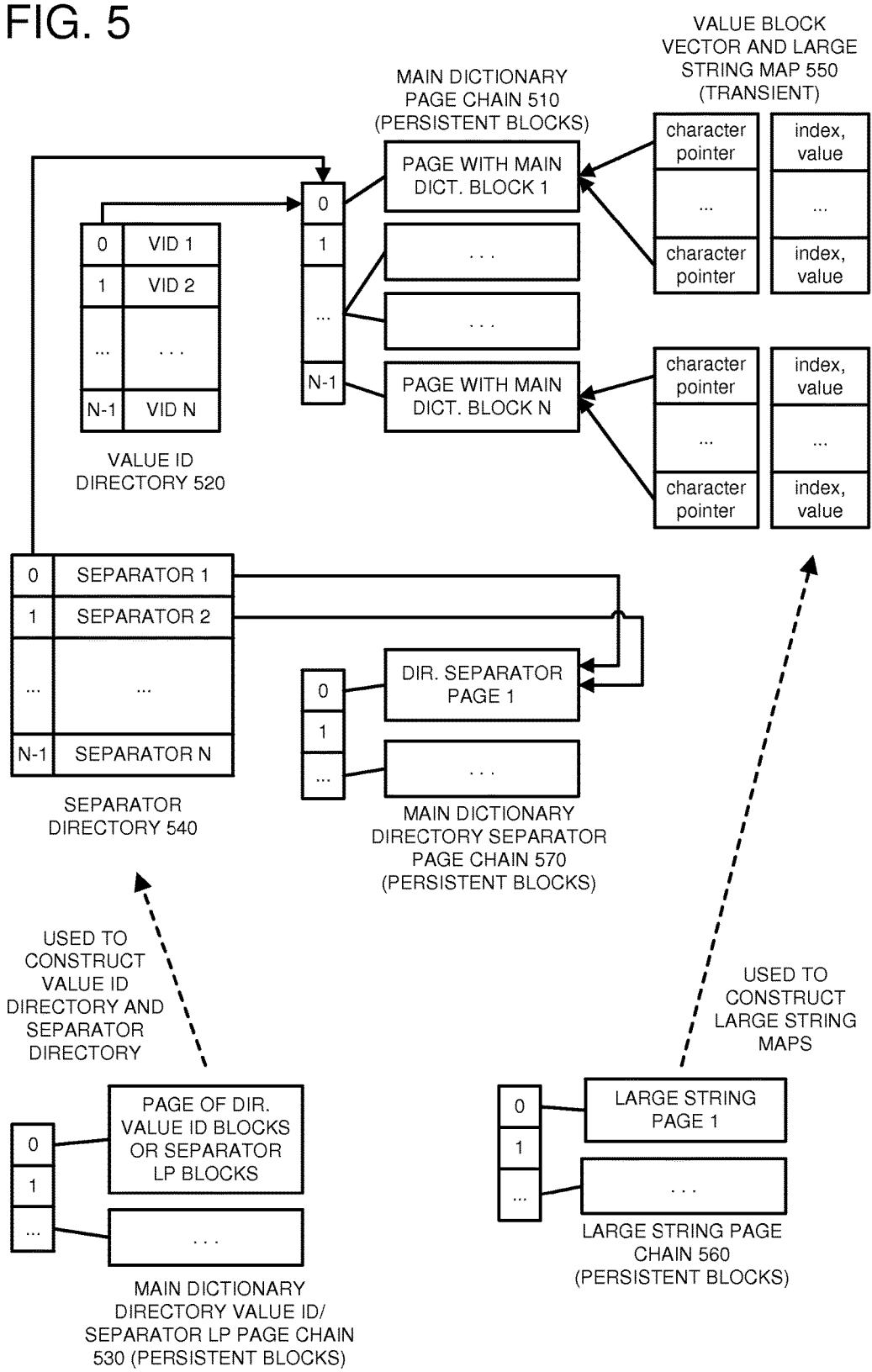
FIG. 5 is a diagram illustrating relationships between directory and dictionary pages.

FIG. 5 is a diagram illustrating relationships between directory and dictionary pages for a unified table, such as the unified table 130 of FIG. 1 or another unified table. The dictionary pages contain, for example, blocks of data loaded from persistent storage into memory.

Dictionary storage objects may include objects such as a value ID directory 520, a separator directory 540, and transient objects such as a value block vector and large string map 550. To support paging in a main dictionary, directory/look-up information for each main dictionary may be stored to ensure that only relevant dictionary blocks are loaded into memory. In order to load the relevant main dictionary blocks, the following information may be stored for each dictionary block: a last value ID for the dictionary block and a separator (discerning prefix) of the uncompressed last value in the dictionary block. In particular, the value ID directory 520 and separator directory 540 are constructed using such information, and then used to determine which dictionary blocks to load into memory.

The value ID directory 520 may include the last value IDs for main dictionary string blocks. In the value ID directory 520, the last value ID for a given main dictionary string block is associated with a page index for the page containing that main dictionary string block in the main dictionary page chain. For example, the entry at index 0 of the value ID directory 520 contains the last value ID of a string on page 0 in the main dictionary page chain 510.

The separator directory 540 may include LPs to separators for the main dictionary string blocks. In the separator directory 540, the separator for a given main dictionary string block is associated with a page index for the page containing that main dictionary string block in the main dictionary page chain. For example, the entry at index 0 of the separator directory 540 contains the separator for the last string (or part thereof) stored on page 0 in the main dictionary page chain 510. Alternatively, instead of storing LPs to separators, the separator directory 540 may include uncompressed last value separators for the main dictionary string blocks.

The value block vector, e.g., as described above with reference to FIG. 5, stores character pointers (char *) to the starts of the respective value blocks of a dictionary block contained in a dictionary page of the main dictionary page chain 510. That is, the value block vector is an array of physical memory pointers to each value block in the dictionary page. The large string map, e.g., as described above with reference to FIG. 4, stores or references materialized large string values. The value block vector and large string map 550 are associated with a particular dictionary block/dictionary page, and they can be created for each dictionary page that is loaded in memory.

Various page chains may also be used to support paged dictionaries. The page chains include blocks of data, which can be loaded into memory. FIG. 5 shows a main dictionary page chain 510, a large string page chain 560, a main dictionary directory separator page chain 570, and a main dictionary directory value ID/separator logical pointer LP page chain 530.

The main dictionary page chain 510 may include pages storing main dictionary blocks. The dictionary blocks are selectively loaded based on the last value ID or separator of the uncompressed last value for the respective dictionary blocks. In some example implementations, one main dictionary page chain 510 may be loaded per column (attribute), which includes dictionary blocks for the dictionary for that column.

The large string page chain 560 may include large string pages for the large string map. In the example implementations, one large string page chain 560 may be loaded per table, so the large string page chain 560 potentially includes large string pages for dictionaries associated with different columns (attributes) of the table.

The main dictionary directory value ID/separator LP page chain 530 may include pages storing main dictionary directory value ID blocks (for the value ID directory) and/or main dictionary directory separator LP blocks (for the separator directory 540). A single page can include one or more value ID blocks and one or more separator LP blocks. A main dictionary directory value ID block may store the last value IDs of dictionary blocks, where the last value IDs are typically fixed-length values. A main dictionary directory separator LP block may store LPs to some of the separators for dictionary blocks, where the LPs are typically fixed-length values. In the example implementations, one main dictionary directory value ID/separator LP page chain 530 may be loaded per table, so the directory value ID/separator LP page chain 530 potentially includes value ID blocks and separator LP blocks for dictionaries associated with different columns (attributes) of the table.

The main dictionary directory separator page chain 570 may include main dictionary directory separator pages (for a separator directory). A main dictionary directory separator page may include one or more separators for the uncompressed last values of dictionary blocks, where the separators are typically variable-length values. In the example implementations, one main dictionary directory separator page chain 570 may be loaded per table, so the separator page chain 570 potentially includes separator pages for dictionaries associated with different columns (attributes) of the table.

Alternatively, one of each of the page chains can be associated with a given column. However, the page chains are not limited as such. For example, the page chains are not limited to either column or table. For example, one main dictionary page chain may be loaded per table. Alternatively, more than one main dictionary page chain may be loaded per column.

In the previous examples in this section, the value ID directory includes last value IDs, and the separator directory includes separators for last string values. Alternatively, a value ID directory and separator directory can include (store or reference) other types of values. For example, the value ID directory includes first value IDs of string values of dictionary blocks, and the separator directory includes separators for first string values of dictionary blocks. The first value IDs and separators (for first string values) can be used to determine which dictionary block to load into memory, which dictionary block to search for a value, and so on.

Example 6—Persistent Data Layouts for Paged Column Dictionary

Figure 6:
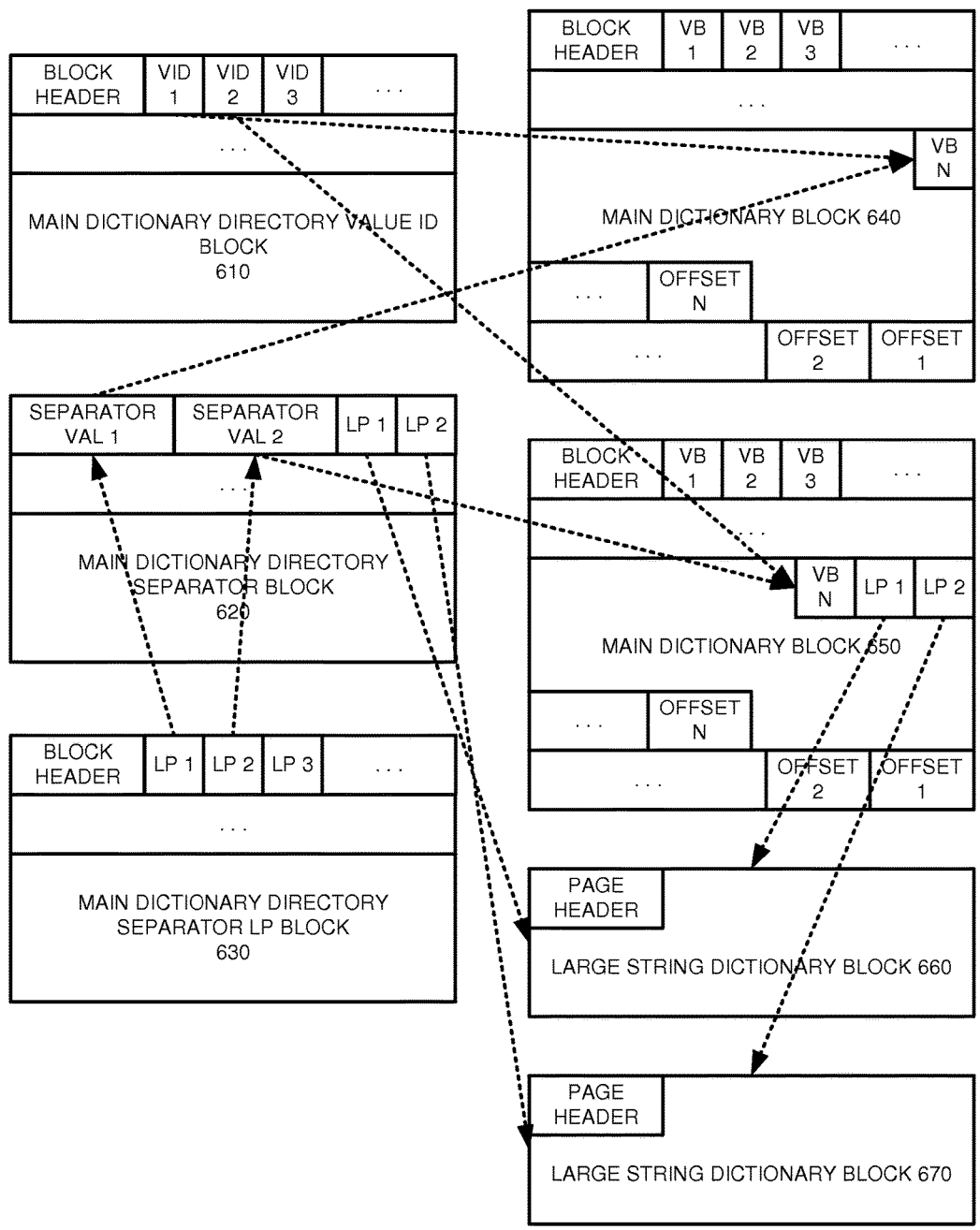
FIG. 6 is a diagram illustrating the persistent data layout for example dictionary blocks and pages for a unified table of a paged column dictionary.

FIG. 6 is a diagram illustrating data layout for example dictionary blocks and pages for a paged column dictionary. FIG. 6 shows a main dictionary directory value ID block 610, a main dictionary directory separator block 620, a main dictionary directory separator LP block 630, two main dictionary blocks 640, 650, and two large string dictionary blocks 660, 670.

FIG. 6 shows persistent data used to implement a value ID directory and a separator directory. Directory information may be stored as value ID directory blocks, separator directory blocks, and/or separator LP directory blocks. For example, the value ID directory blocks and separator LP directory blocks are blocks of fixed length data, and the separator blocks are blocks of variable length data. For value ID directory blocks and separator LP directory blocks, multiple blocks may be stored on the same page in a page chain. Further, for separator directory blocks, multiple blocks may be stored on the same page in a page chain.

As explained with reference to FIG. 5, a value ID directory may map the value ID (e.g., a last value ID) of each main dictionary block to the page chain index of the page that contains that main dictionary block. Persistent data for the value ID directory may be stored as one or more main dictionary directory value ID blocks, which store the last value IDs for main dictionary blocks. In FIG. 6, the main dictionary directory value ID block 610 contains a value ID (e.g., last value ID) of each of several main dictionary blocks 640, 650 of the main dictionary. An entry of the main dictionary directory value ID block 610 stores a value ID (e.g., last value ID) for a main dictionary block. For example, VID 1 of the main dictionary directory value ID block 610 contains the last value ID associated with a final string value represented in the main dictionary block 640 in the main dictionary page chain. VID 2 of the main dictionary directory value ID block 610 contains the last value ID associated with a final string value represented in the main dictionary block 650 in the main dictionary page chain. The value ID directory allows the correct main dictionary block page to be loaded from disk into memory given a value ID. The value ID directory may be persisted in the one or more main dictionary directory value ID blocks 610. Main dictionary directory value ID blocks 610 may be contained in main dictionary directory pages, which may contain multiple such blocks.

As explained with reference to FIG. 5, a separator directory may map a discerning string prefix (e.g., the last discerning string prefix) of each main dictionary block to the page chain index of the page that contains that main dictionary block. Persistent data for the separator directory may be stored as one or more separator blocks, which store separators (discerning prefixes) for string values (e.g., the last string values) of the respective main dictionary blocks, and one or more separator LP blocks, which store LPs to the separators in the separator blocks. In FIG. 6, the main dictionary directory separator block 620 contains separators (e.g., uncompressed last value strings, or parts thereof) of each of several main dictionary block 640, 650 of the main dictionary. The uncompressed value strings can be stored in value block format, one string per value block. An entry of the main dictionary directory separator block 620 stores a separator, or part of a separator, for a main dictionary block. For example, SEPARATOR VAL 1 of the main dictionary directory separator block 620 contains the last value string (or part of the last string value) for the main dictionary block 640 in the main dictionary page chain. SEPARATOR VAL 2 of the main dictionary directory separator block 620 contains the last value string (or part of the last string value) for the main dictionary block 650 in the main dictionary page chain. The separator directory allows the correct main dictionary block page to be loaded from disk into memory given a separator. Main dictionary directory separator blocks 620 may be contained in main dictionary separator pages, which may contain multiple separator strings.

The one or more main dictionary directory separator LP blocks contain logical pointers (LPs) to the separators of the main dictionary directory separator blocks. In FIG. 6, the main dictionary directory separator LP block 630 stores LPs to separators in the main dictionary directory separator block 620. For example, LP 1 of main dictionary directory separator LP block 630 is a LP to SEPARATOR VAL 1 of main dictionary directory separator block 620. Main dictionary directory separator LP blocks may be contained in main dictionary directory pages, which may contain multiple such blocks.

If a separator string value is a large string (e.g., greater than a threshold size such as 32K or some other size such as the remaining space in the dictionary block), an entry of the directory separator block 620 may contain the first portion of the string and one or more LPs to one or more large string dictionary blocks 660, 670 containing the remainder of the string. For example, LP 1 of main dictionary directory separator block 620 may reference large string dictionary block 660 for part of the remainder of SEPARATOR VAL 2, and LP 2 of main dictionary directory separator page 620 may reference large string dictionary block 670 for the rest of the remainder of SEPARATOR VAL 2.

Example 7—Loading Dictionary Pages and Other Operations

Figure 7:
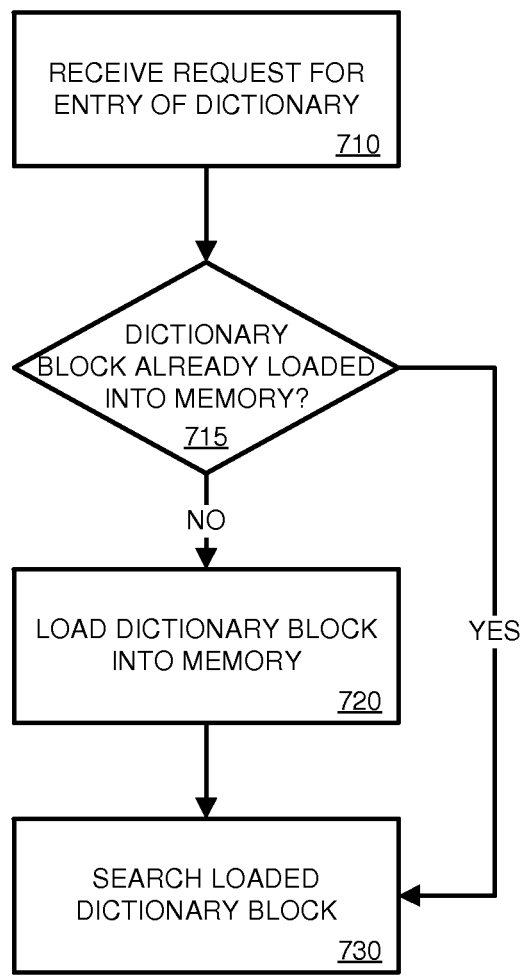
FIG. 7 is a flowchart of an example method for loading dictionary pages into memory.

FIG. 7 is a flowchart of an example method for loading dictionary pages into memory.

To start, a request for an entry of a dictionary is received (710). In general, the dictionary stores string values that are associated with corresponding value IDs for purposes of dictionary compression. The dictionary may have multiple dictionary blocks. The request may contain a value ID or a value string. For example, the request can be to find a string value for a particular value ID. Or, the request can be to find a string value after a particular value ID. Or, the request can be to find a value ID for a particular string value.

Suppose the column data of a table contains entries having a value ID corresponding to a variable length string in the dictionary. To retrieve a value corresponding to a value ID or value ID corresponding to a string, the dictionary determines which dictionary block to load based on the value ID or value string of the request.

Once the correct dictionary block is identified, if the dictionary block is not already loaded into memory (715), the dictionary block is loaded into memory (720). This allows for on-demand page management of the in-memory database, since only those dictionary blocks that are used are loaded into memory. If the identified dictionary block has already been loaded into memory, the loading (720) is skipped. Thus, the identified dictionary block is selectively loaded into memory.

The dictionary block that has been loaded into memory is then searched (730). Since the appropriate dictionary block is loaded into memory, the dictionary can be searched for the requested variable length string.

Figure 8:
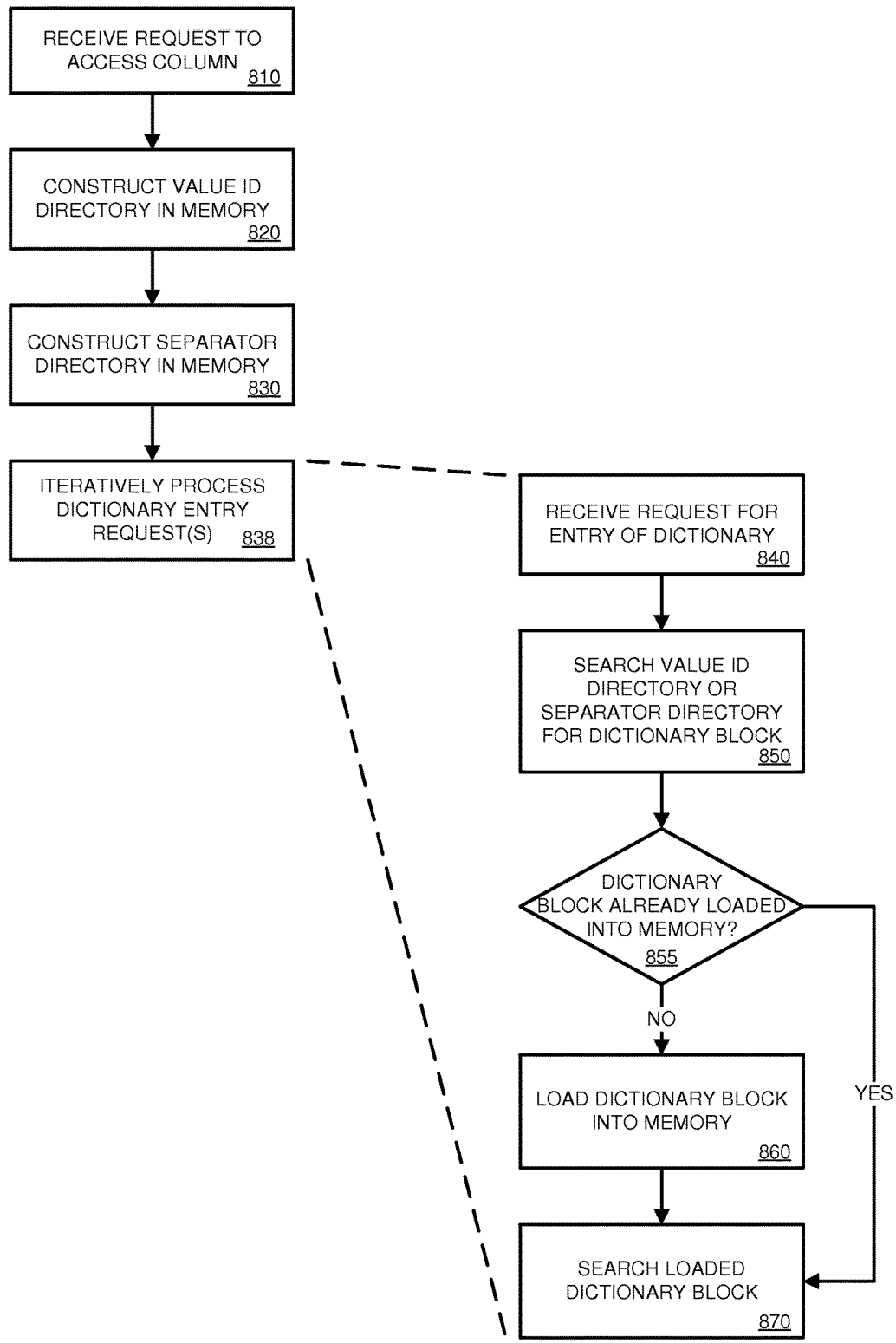
FIG. 8 is a flowchart of another example method for loading dictionary pages into memory.

FIG. 8 is a flowchart of another example method for loading dictionary pages into memory.

A request to access a column is received (810). For example, the request to access the column can be an initial request for an entry of the column, which is represented in the dictionary, or it can be some other type of request. Since the data for the column contains value IDs, values corresponding to the value IDs need to be retrieved. However, instead of retrieving values for all of the value IDs, only those values needed may be loaded. To determine which values are needed, directory structures are constructed.

A value ID directory may be constructed in memory at the time of column access (820). The value ID directory may be constructed by loading one or more main dictionary directory value ID blocks, which contain value IDs for the multiple dictionary blocks. The directory entries for the value ID directory may be fully materialized (i.e., loaded into memory) during loading, resulting in a two-dimensional array that maps value IDs (e.g., last value IDs) to page indices for the pages that contain the corresponding dictionary blocks. Alternatively, the directory value ID blocks may be scanned at runtime when handling a load or access operation. The value ID directory may include value IDs (e.g., last value IDs) for the multiple dictionary blocks, and each of the value IDs may be mapped to an index of one of the multiple dictionary blocks that includes a string value for that value ID.

A separator directory may also be constructed in memory at the time of column access (830). The separator directory may be constructed by loading one or more main dictionary directory separator pages (which contain separators for the multiple dictionary blocks) and one or more separator LP pages (which contain LPs to the separators for the multiple dictionary blocks). The directory entries for the separator directory may be LPs that point to data resident on the separator pages, and the main dictionary directory separator pages can be pinned for the lifespan of the dictionary. The separator directory may include (store or reference) separators for the multiple dictionary blocks, and each of the separators may be mapped to an index of one of the multiple dictionary blocks that includes a string value for that separator.

If a separator value is a large string value, the separator value may be fully materialized. In other words, the large string dictionary pages will be loaded to fully materialize this value. Then, a separator directory can include a logical pointer to the materialized large string value. For example, the materialized large string value can be stored at a single contiguous memory location. The same memory location (storing the materialized large string value) can also be referenced by a pointer in a large string map, which the large string map is created. Alternatively, a separator that is a large string value can be materialized on demand (e.g., when needed to determine which dictionary block to load into memory).

One or more dictionary entry requests may then be iteratively processed (838). In FIG. 8, operations 840 to 870 illustrate processing for a single request for an entry of the dictionary. The operations can be repeated for one or more other requests.

A request for an entry of the dictionary is received (840). Again, the dictionary generally stores string values that are associated with corresponding value IDs for purposes of dictionary compression, and the dictionary may have multiple dictionary blocks. The request may contain a value ID or a value string.

The value ID directory or separator directory may be searched to identify a dictionary block (i.e., determine the index of the page containing the relevant main dictionary block) (850). For example, the value ID directory may be searched using a value ID for the request (that is, comparing the value ID to the value IDs in the value ID directory) to determine an index of the one of the multiple dictionary blocks that is to be loaded into memory. Or, the separator directory may be searched using a string value for the request to determine the index of the one of the multiple dictionary blocks that is to be loaded into memory. The search of the value ID directory or separator directory can be a binary search or other type of search.

If the dictionary block is not already loaded into memory (855), the dictionary block may be loaded into memory (860) (i.e., as a main dictionary page). A value block vector (and large string map) associated with the main dictionary page may also be constructed.

The dictionary block that has been loaded into memory may be searched (870). For example, through the value block vector associated with the dictionary page for the dictionary block, value blocks of the dictionary block may be searched using a value ID for the request to find the requested value. The number of strings per value block may be known (e.g., 16 strings per value block, for any value block before the last value block in the dictionary block). The given value block containing the requested value for the value ID can be determined by counting strings in value blocks from the beginning of the dictionary block. String values in the given value block are constructed up to the requested value, and the requested value (or a pointer to the requested value) is returned. As another example, through the value block vector associated with the dictionary page for the dictionary block, value blocks of the dictionary block may be binary searched using a value string for the request to find the requested value ID. The first string in a given value block can be reconstructed and compared to the value string for the request, to determine whether the value string for the request may be in (a) an earlier value block or (b) the given value block or a later value block of the dictionary block. When a given value block is found through the binary search, string values in the given value block can be constructed up to the value string for the request. If the value string is found, the appropriate value ID can be returned (e.g., counting strings in value blocks from the beginning of the dictionary block). (The string values in the value blocks of the dictionary page for the paged dictionary can be accessed using the physical memory pointers in the value block vector, like the string values for a non-paged dictionary.)

If the requested value is a large string value and has not been materialized, the large string pages storing overflow data may be loaded to build the large string value on demand. The string may be added to the large string map associated with the page, e.g., by adding a pointer to the materialized large string value to the large string map. Alternatively, large string values in the large string map are materialized when the dictionary block is loaded into memory.

When a second request for an entry of the dictionary having multiple dictionary blocks is received, the dictionary block that includes the entry is selectively loaded into memory (the value ID directory and separator directory having already been constructed). It may be determined that the dictionary block that includes the entry for the second request has already been loaded into memory. Thus, the dictionary block need not be reloaded into memory. The loaded (i.e., previously loaded) dictionary block may be searched for the entry.

When a loaded page is removed from memory, the associated value block vector can be cleared and any entries in the associated large string map can be de-allocated.

For a merge operation, data can be written to main dictionary blocks and large string pages as required. When a page containing a main dictionary block is full, the corresponding last value IDs and uncompressed last value separators may be written to the value ID directory and the separator directory, respectively. The main dictionary directory separator page(s) can always be pinned for the lifespan of the dictionary.

In some example implementations, paged dictionaries are used for columns of main storage (main memory), but not for delta stores. The paged dictionaries are created or updated upon delta merge operations, but remain read-only between delta merge operations. For a delta merge operation, old dictionaries can be replaced with new dictionaries. The old dictionaries can be garbage collected after a successful merge operation.

Example 8—Large String Handling

Figure 9:
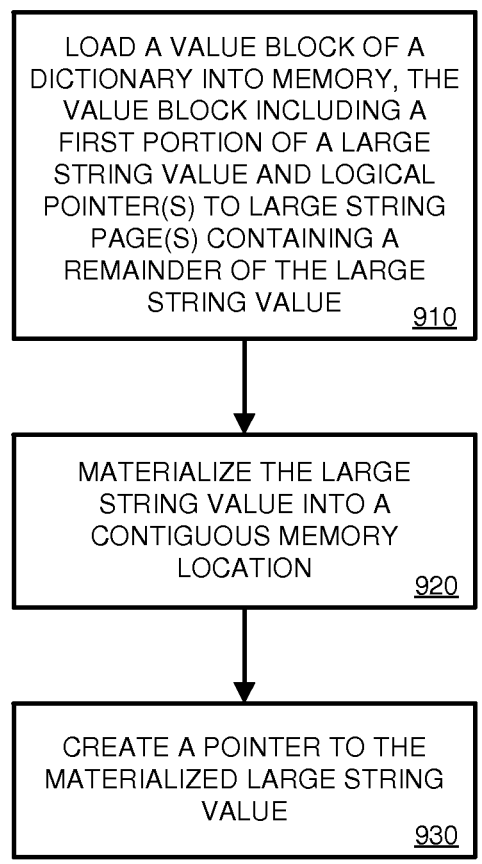
FIG. 9 is a flowchart of an example method for loading a large string value into memory.

FIG. 9 is a flowchart of an example method for loading a large string value into memory.

To start, a value block of a dictionary is loaded into memory (910). The dictionary stores string values for dictionary compression. For example, the dictionary is a paged-column main dictionary as described with reference to FIG. 1. The value block includes (a) a first portion of a large string value and (b) one or more logical pointers to one or more large string pages containing a remainder of the large string value, e.g., one logical pointer to each large string page. The layout of the value block can be the layout shown in FIG. 2b or another layout.

The large string value is materialized into a contiguous memory location (920). For example, the first portion of the large string value and the remainder portions in the large string page(s) are loaded into memory at the contiguous memory location. Each of the large string page(s) can include a header and a portion of the large string value. The rest of the large string value that is materialized can be provided by a prefix, if any, and the first portion of the large string value from the value block. Thus, the string portions for the large string value are copied into the single contiguous memory location, starting from a shared prefix portion (if any), continuing with the "on-page" portion in the value block, and then continuing with the remainder portion in each of the large string page(s).

A pointer to the materialized large string value is created (930). The pointer can be stored in a large string map that is constructed. The large string map can store one or more pairs of values, where a pair includes, e.g., (a) an index and (b) the materialized large string value or the pointer to the materialized large string value. Also, for a paged dictionary, the pointer to the materialized large string value can be stored in a separator dictionary, if the large string value is a separator for a value block.

When the dictionary is a paged dictionary that has multiple dictionary blocks, one of the dictionary blocks that contains the value block can be loaded into memory in response to a request for the large string value (or another string value in the value block or another value block in the dictionary block). For the paged dictionary, a separator directory may be constructed in memory before any of the dictionary blocks is loaded. The separator directory may include separators for the dictionary blocks, and may be constructed using one or more directory blocks that contain the separators for the dictionary blocks and one or more directory blocks that contain logical pointers to the separators. In some cases, the large string value may be the separator for a dictionary block. In this case, a separator can be mapped to an index of the one of the dictionary blocks that includes the first portion of the large string value for that separator. Subsequently, the separator directory can be searched using the large string value to determine the index of the one of the dictionary blocks including the first portion of the large string value. Also, when a request for the large string value is later received, it may be determined that the one of the multiple dictionary blocks that includes the value block has already been loaded into memory, and the loaded dictionary block may be searched for the large string value. Also, for the paged dictionary, a value ID directory may be constructed in memory before any of the dictionary blocks is loaded. When a request for a large string value is received (containing a value ID), the appropriate dictionary block is identified and loaded into memory (if not already loaded), and the appropriate value block is found in the dictionary block. Then, the large string value can be dynamically materialized into a single contiguous memory location using the large string value's prefix (if any), the portion of the large string value in the appropriate value block and any remainder portions in large string page(s).

Example 9—Computing Systems

Figure 10:
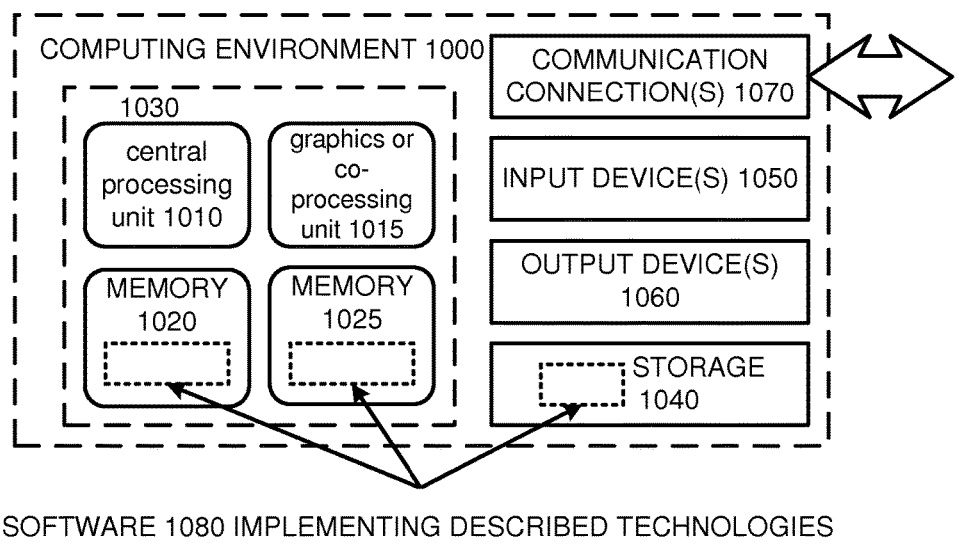
FIG. 10 is a diagram illustrating an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 (also called computer-readable storage) may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions (also called machine-readable instructions), such as those included in program modules (also called computer program product), being executed in a computing system on a target real or virtual processor. Generally, program modules include routines, programs, libraries, objects, classes, components, data structures, etc.

that perform particular tasks or implement particular abstract data types. The functionality of the program modules may be combined or split between program modules as desired in various embodiments. Computer-executable instructions for program modules may be executed within a local or distributed computing system.

The disclosed methods can also be implemented using specialized computing hardware configured to perform any of the disclosed methods. For example, the disclosed methods can be implemented by an integrated circuit specially designed or configured to implement any of the disclosed methods (e.g., an ASIC such as an ASIC digital signal process unit, a graphics processing unit, or a programmable logic device such as a field programmable gate array).

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 11:
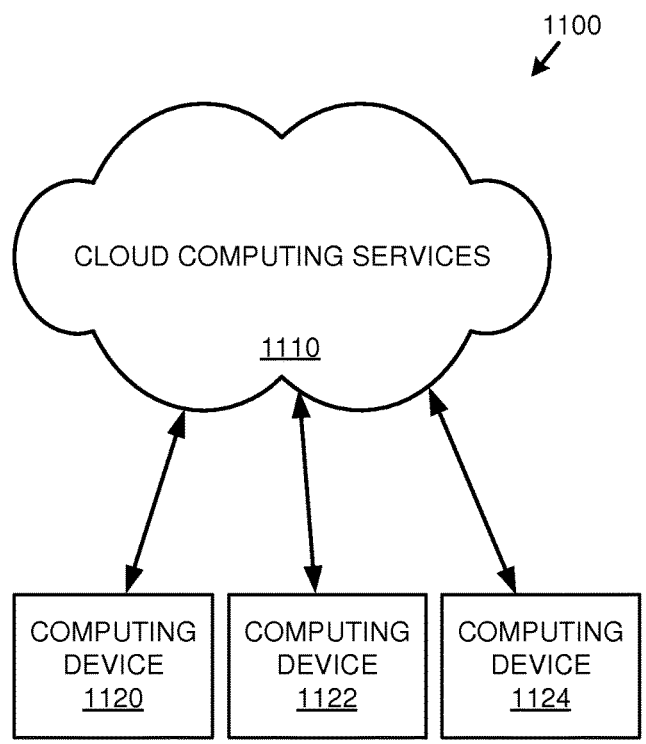
FIG. 11 is a diagram illustrating an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 11—Implementation Choices

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020, 1025, storage 1040, and combinations of any of the above. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Various alternatives to the examples described herein are possible. For example, some of the methods described herein can be altered by changing the ordering of the acts described, or by splitting, repeating, or omitting certain acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

The technologies from any example can be combined with the technologies described in any one or more of the other examples. In view of the many possible embodiments to which the principles of the disclosed technology may be applied, it should be recognized that the illustrated embodiments are only examples of the disclosed technology and should not be taken as limiting the scope of the disclosed technology. Rather, the scope of the disclosed technology includes what is covered by the scope and spirit of the following claims.

We claim:

1. A method, implemented by a computing system comprising one or more processors coupled to one or more memories, comprising:
   receiving a request to access a large string value, the request comprising a value ID;
   with a value ID directory loaded into a memory of the one or more memories, determining a dictionary block ID of a dictionary block associated with the value ID, the dictionary storing string values for dictionary compression;
   from a determined dictionary block, loaded into a memory of the one or more memories, having the determined dictionary block ID and comprising one or more value blocks having value block IDs, accessing a value block having a value block ID corresponding to the value ID, the accessed value block comprising a first portion of the requested large string value and one or more logical pointers to one or more large string pages containing a remainder of the large string value;
   loading, with a processor of the one or more processors, the first portion of the large string value from the accessed value block, and loading the remainder of the large string value by dereferencing the one or more logical pointers to load from at least corresponding referenced large string pages the remainder of the large string value, providing the large string value;
   storing, with a processor of the one or more processors, the loaded large string value into a contiguous memory location of the one or more memories, the contiguous memory location comprising a plurality of sequential, addressable memory locations, the contiguous memory location further comprising an addressable starting memory location having an address;
   creating, with a processor of the one or more processors, a pointer to the starting memory address of the stored large string value;
   storing, with a processor of the one or more processors, the pointer to the large string value; and
   returning a pointer that can be dereferenced to access the stored large string value in response to the request.

2. The method of claim 1, further comprising:
   constructing a large string map, wherein the large string map stores one or more pairs of values, one of the one or more pairs of values including (a) an index and (b) the large string value or the pointer to the stored large string value.

3. The method of claim 1, further comprising:
   loading the one or more large string pages, each of the one or more large string pages comprising:
   a header; and
   a portion of the large string value.

4. The method of claim 1, wherein the dictionary is a paged dictionary that has multiple dictionary blocks, and wherein one of the multiple dictionary blocks containing the value block is loaded into memory in response to a request for a string value in the value block.

5. The method of claim 4, further comprising:
   constructing a separator directory in memory, wherein the separator directory includes separators for the multiple dictionary blocks, wherein at least one the separators is mapped to an index of the one of the multiple dictionary blocks that includes the first portion of the large string value for that separator.

6. The method of claim 5, wherein the separator directory comprises one or more directory blocks that contain the separators for the multiple dictionary blocks and one or more directory blocks that contain logical pointers to the separators.

7. The method of claim 5, further comprising:
   searching the separator directory using the large string value to determine the index of the one of the multiple dictionary blocks including the first portion of the large string value.

8. The method of claim 4, further comprising:
   determining that the one of the multiple dictionary blocks that includes the value block has already been loaded into memory; and
   searching the loaded dictionary block for the large string value.

9. The method of claim 1, wherein the large string value in the value block is represented using segments that comprise:
   a first segment specifying a prefix length of a common prefix between the large string value and its predecessor string value;
   a second segment specifying a length of the first portion of the large string value;
   a third segment comprising the first portion of the large string value;
   a fourth segment specifying zero or more logical pointers to the one or more large string pages containing the remainder of the large string value;
   a fifth segment specifying number of the logical pointers in the fourth segment; and
   a sixth segment specifying a total length of the large string value.

10. One or more computer-readable storage medium comprising computer-executable instructions usable by one or more processors of a computing system, the one or more processors in communication with the one or more computer-readable storage medium, to perform operations to support handling of large string values for a dictionary in memory, the operations comprising:
    receiving a request to access a large string value, the request comprising a string value;
    with a separator directory comprising one or more directory separator blocks, at least one of the one or more directory separator blocks comprising separators for multiple dictionary blocks of a dictionary, determining a dictionary block ID associated with the string value, wherein:
    the multiple dictionary blocks store string values for dictionary compression;

a determined dictionary block of the multiple dictionary blocks has the determined dictionary block ID;
each of the one or more directory separator blocks stores at least some of the separators;
at least a portion of the multiple dictionary blocks store one or more large string values for dictionary compression;
the determined dictionary block stores part of a large string value corresponding to the string value of the request and one or more logical pointers for one or more large string blocks comprising a remainder of the large string value;
from the determined dictionary block, loaded into memory, accessing a first portion of the requested large string value and one or more logical pointers to at least one of one or more large string blocks containing a remainder of a large string value associated with the string value of the request;
loading the first portion of the large string value from the determined dictionary block, and loading the remainder of the large string value by following the one or more logical pointers to load from at least corresponding referenced large string blocks the remainder of the large string value, providing the large string value;
storing the loaded large string value into a contiguous memory location, the contiguous memory location comprising an addressable starting memory location having an address;
creating a pointer to the starting memory address of the stored large string value;
storing the pointer to the large string value; and
returning a pointer that can be followed to access the stored large string value in response to the request.

11. The computer-readable storage medium of claim 10, the operations further comprising:
accessing at least one of the separators using a separator logical pointer (LP) block for the separator directory, the separator LP block storing LPs to at least some of the separators.

12. The computer-readable storage medium of claim 10, the operations further comprising:
storing the pointer to the loaded large string value in a large string map, the large string map storing one or more pairs of values, one of the one or more pairs of values including (a) an index and (b) a given large string value among the one or more large string values or a pointer to the given large string value.

13. The computer-readable storage medium of claim 10, wherein a given large string value among the one or more string values is represented using segments that comprise:
a first segment specifying a prefix length of a common prefix between the given large string value and its predecessor string value;
a second segment specifying a length of a portion of the given large string value;
a third segment comprising the portion of the given large string value;
a fourth segment specifying zero or more logical pointers to large string pages;
a fifth segment specifying number of the logical pointers in the fourth segment; and
a sixth segment specifying a total length of the given large string value.

14. A database system comprising:
one or more processors; and
one or more memories in communication with the one or more processors, the one or more memories storing computer-executable instructions to perform operations comprising:
receiving a request to access a large string value, the request comprising a value ID or a value string;
searching a value block vector, the value block vector associated with a dictionary page for a dictionary block of a dictionary comprising multiple dictionary blocks, for a value block corresponding to the value ID, or a value ID corresponding to the value string, the value block comprising a first portion of the requested large string value and one or more physical or logical pointers to one or more large string blocks containing a remainder of the large string value;
loading the first portion of the large string value from the value block, and loading the remainder of the large string value by dereferencing the one or more physical or logical pointers to load from at least corresponding referenced large string blocks the remainder of the large string value, providing the large string value;
storing the loaded large string value in memory;
creating a pointer to the stored large string value;
storing the pointer to the large string value; and
returning a pointer that can be dereferenced to access the stored large string value in response to the request.

15. The database system of claim 14, the operations further comprising:
constructing a separator directory adapted to provide access to an entry of the string dictionary, given a string value.

16. The database system of claim 14, the operations further comprising:
receiving a request to access a large string value, the request comprising a string value;
searching a separator directory for a separator of one of the multiple dictionary blocks that contains at least a portion of the string value provided in the request, and
loading the one of the multiple dictionary blocks that contains the at least the portion of the string value provided in the request.

17. The database system of claim 14, the operations further comprising:
constructing a large string map associated with at least one of the multiple dictionary blocks, wherein the large string map stores one or more pairs of values, one of the one or more pairs of values including (a) an index and (b) a given large string value of the large string values or a pointer to the given large string value.

18. The database system of claim 14, the operations further comprising:
loading one or more intermediate dictionary blocks, each of the one or more intermediate dictionary blocks containing one or more logical pointers to one or more value blocks of one or more of the multiple dictionary blocks for normal string values and/or one or more logical pointers to one or more large string dictionary blocks for large string values.

19. The database system of claim 18, wherein the large string values are retrieved from the large string dictionary blocks.

20. The database system of claim 19, wherein after the large string values are retrieved, the large string dictionary blocks are marked as being removable from at least one memory of the one or more memories.

\* \* \* \* \*